Sept. 23, 1924. 1,509,762
A. C. McCORD
ALMOND DIPPING MACHINE
Filed Oct. 4, 1922 2 Sheets-Sheet 2
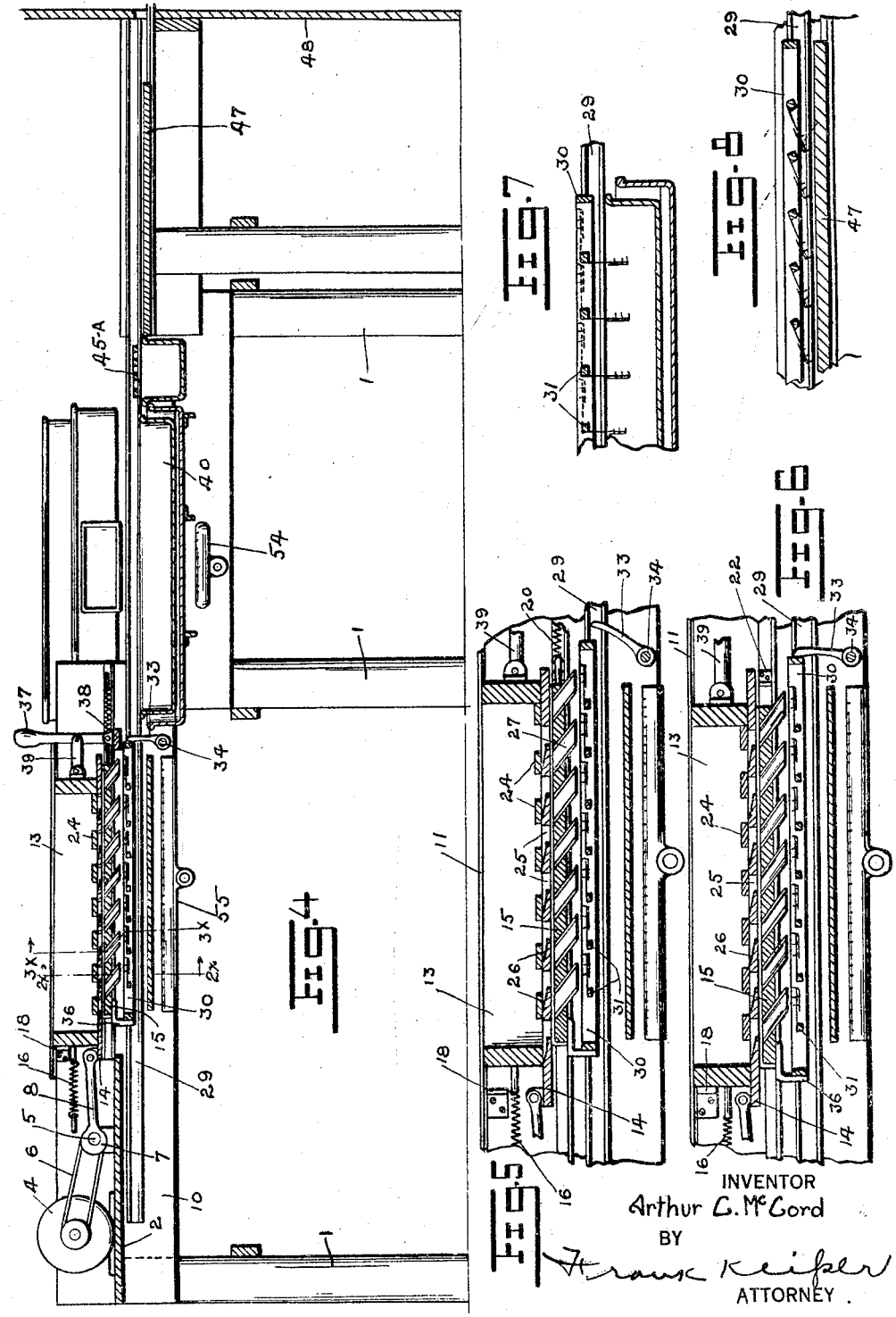
INVENTOR
Arthur C. McCord
BY
Frank Keifer
ATTORNEY.

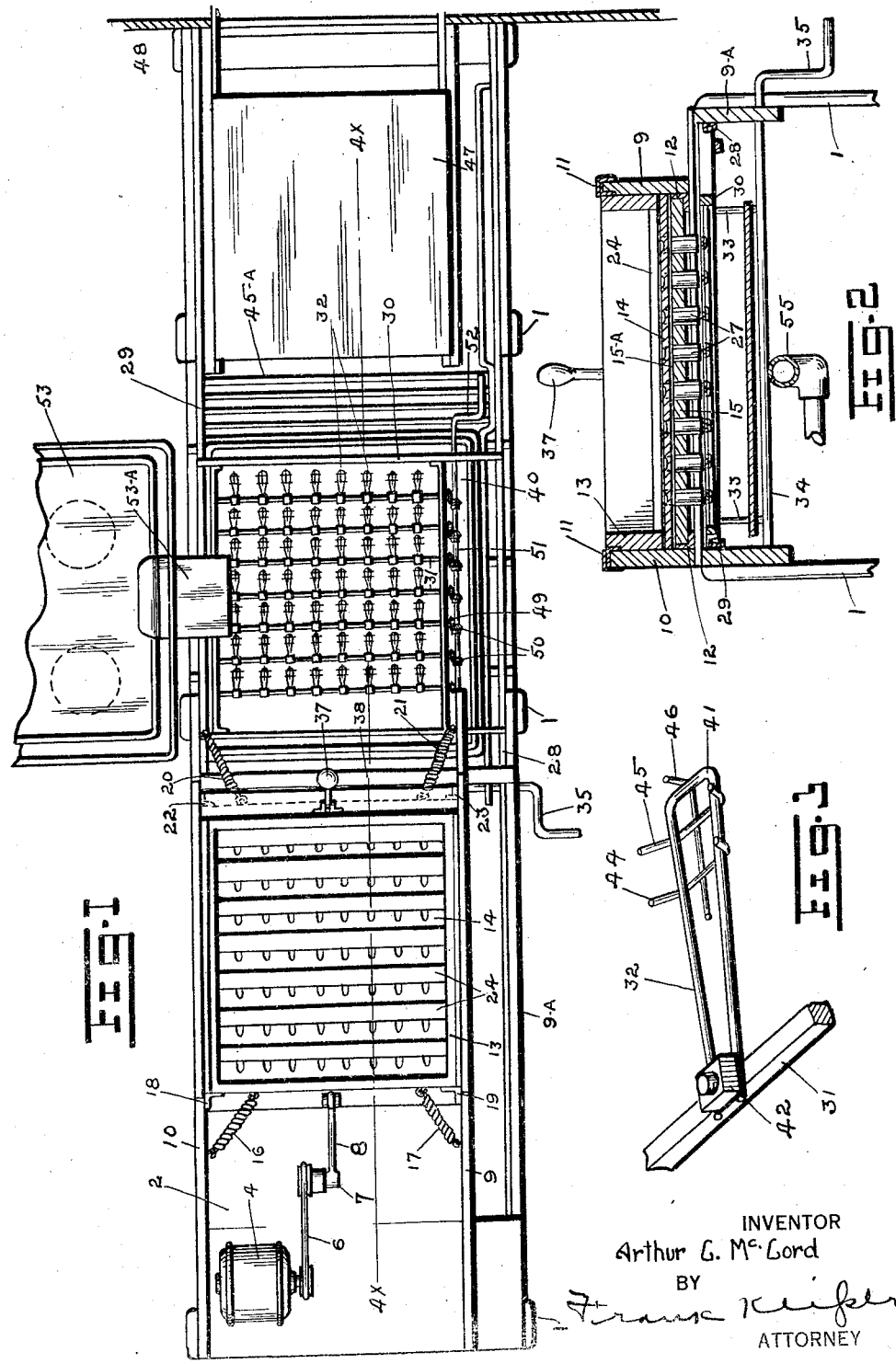

Patented Sept. 23, 1924.

1,509,762

UNITED STATES PATENT OFFICE.

ARTHUR C. McCORD, OF ROCHESTER, NEW YORK, ASSIGNOR TO FRANKLIN D. McCORD, OF ROCHESTER, NEW YORK.

ALMOND-DIPPING MACHINE.

Application filed October 4, 1922. Serial No. 592,258.

*To all whom it may concern:*

Be it known that I, ARTHUR C. McCORD, a citizen of the United States, residing at Rochester, in the county of Monroe and State of New York, have invented certain new and useful Improvements in Almond-Dipping Machines, of which the following is a specification.

The object of this invention is to provide a machine for dipping almonds or other nuts into a tray containing liquid chocolate for the purpose of coating them therewith.

These and other objects of this invention will be fully illustrated in the drawings, described in the specification and pointed out in the claims at the end thereof.

In the accompanying drawings:

Figure 1 is a top plan view of the machine.

Figure 2 is an enlarged vertical sectional view of the hopper of the machine, the section being taken on the line $2^x$—$2^x$ of Figure 4.

Figure 3 is a detail perspective view of one of the spoons, forks or baskets for dipping the almonds, or other nuts into the liquid chocolate.

Figure 4 is a vertical longitudinal cross section through the machine, the section being taken on the line $4^x$—$4^x$ of Figure 1.

Figures 5 and 6 are enlarged detail sectional views of the hopper taken on the line $4^x$—$4^x$ of Figure 1 showing the parts thereof in the positions which they occupy for the purpose of loading the spoons with the nuts prior to the dipping operation.

Figure 7 is an enlarged detail longitudinal section of a portion of the tray containing the liquid chocolate showing the spoons in place therein during their dipping operation, the section being taken on the line $4^x$—$4^x$ of Figure 1.

Figure 8 is an enlarged detail longitudinal sectional view of the receiving table showing the spoons ready to deposit the coated nuts on this table, the section being taken on the line $4^x$—$4^x$ of Figure 1.

In the several figures of the drawings like reference numerals indicate like parts.

Chocolate coated almonds or other nuts are at the present time coated by hand, that is, each of the nuts is dipped separately into the liquid chocolate and deposited on a table for cooling in order to make the chocolate coating set quickly. In the machine forming the subject matter of my present invention, the individual dipping of each of the nuts is done away with, and a great number of the nuts are dipped and coated at one time. For this purpose I employ a hopper and locating mechanism embodied therein and co-operating therewith so that the nuts from the hopper can be automatically deposited into a series of spoons or baskets. The spoons with the nuts are then adapted to be moved in a unit over a pan containing the liquid chocolate for the coating, dipped into and withdrawn from it to form a coating around the nuts, and then moved away from this tray and placed over a receiving table where the coated nuts are simultaneously deposited on this table through a second operation of the spoons or baskets.

As illustrated in the drawings, the machine made up by this mechanism comprises a suitable frame work that is supported by a number of legs 1, 1. On top of these legs at the left hand end of the machine is supported the short table 2. On this table is mounted the electric motor 4 and the jack shaft 5, a belt 6 being used to drive the jack shaft from the motor through suitable pulleys carried on the motor and jack shaft. Keyed to the jack shaft 5 is an eccentric 7 so that on the rotation of the jack shaft the eccentric rod 8 forming part of the eccentric is reciprocated at a high rate of speed.

The table 2 has the upright sides 9 and 10 provided one on each side thereof which sides project to the right of the table and carry suitable guides between which the hopper which will presently be described is mounted. Both of the sides 9 and 10 also project below the table 2 and while both the upper half and lower half of the side 10 is made up in one piece the lower half of the side 9 is offset from the upper half as indicated at $9^A$ in Figure 2 in order to increase the space between the two sides. In the upper half of each of the sides 9 and 10 are provided a pair of guide rails 11 and 12 between which the members of the hopper is mounted to slide back and forth as will hereinafter be described.

The hopper comprises the rectangular frame or distributing member 13, the reciprocating board or locating member 14 and the conveyor board 15. These three parts of the hopper are adapted to slide one on top of the other, the conveyor board 15 being at the bottom of the hopper and the rectangular frame or distributing member 13 at the top with the reciprocating board or locating member adapted to independently reciprocate between them. The sides of the conveyor board 15 are supported and slide on the guide rails 12, 12 and the top of the sides of the rectangular frame 13 are held down on the reciprocating board 14 by means of the guide rails 11, 11. In this way the three members 13, 14 and 15 of the hopper are held together but are allowed to move independently of one another, the rectangular frame 13 between the guide rails 11, 11 and the top of the reciprocating board, the conveyor board 15 between the guide rails 12, 12 and the bottom of the reciprocating board 14, while the reciprocating board 14 itself is adapted to slide between the bottom of the rectangular frame 13 and the top of the conveyor board 15. For the purpose of making the reciprocating board 14 slide easy on top of the conveyor board 15, a series of thin metal rails 15A are fastened to the top of the conveyor board.

Normally the rectangular frame 13 is held in the position illustrated in Figure 4 in which the expansion springs 16 and 17 pull the frame against the stops 18 and 19 provided on each of the sides 9 and 10. The conveyor board 15 in turn is normally held in the position illustrated in Figure 4 by the expansion springs 20 and 21 which pull this board against the stops 22 and 23 also provided on the sides 9 and 10 respectively on the right hand side of the hopper.

The reciprocating board 14 is connected to the end of the eccentric rod 8 so that on the rotation of the motor this board is constantly reciprocated at a high rate of speed with a movement of about $\frac{1}{4}$ of an inch in either direction. In the bottom of the rectangular frame or distributing member 13 are provided a series of cross slats 24. These slats rest directly on top of the reciprocating board or locating member 14. In this locating member are provided a series of holes 25 each having a short inclined channel 26 leading into it, parallel to the reciprocation of the board. Normally the openings or holes 25 are covered by the slats 24 of the distributing member while the channels 26 thereof project from under them into the space between the slats as illustrated in Figures 1 and 4. The conveyor plate in which a corresponding series of inclined chutes 27 are mounted is normally placed so that the upper ends of these chutes are out of line with the holes 25 in the reciprocating board and are, therefore, covered up by the board.

Mounted to slide between the guide rails 28 and 29 provided in the lower half of the sides 9 and 10 is the dipping frame 30. This dipping frame has a series of horizontal shafts 31 mounted to rotate thereon parallel to one another and each of these shafts carries a series of dipping spoons or baskets 32. These spoons or baskets which will presently be described in more detail are adapted to receive the nuts from the hopper and the frame carrying the spoons or baskets is normally located below the conveyor plate 15 so that each of the inclined chutes of this board points toward one of the spoons or baskets as illustrated in Figures 4, 5 and 6. The dipping frame 30 is held in this position by means of the arms 33 carried on the shaft 34. This shaft is mounted in suitable bearings on the sides 9 and 10 and can be rocked by means of the crank 35 formed on the outer end thereof.

When the arms 33 make contact with the dipping frame as illustrated in Figure 4 they hold the rear end of the frame in contact with the depending lugs 36 carried at the left hand end of the conveyor plate 15 so that both the conveyor plate and the dipping frame are held as a unit below the hopper ready to receive the nuts to be coated.

In the operation of the machine the nuts to be coated are dumped into the rectangular frame or distributing member 13. The action of the reciprocating board 14 through its reciprocation operates to distribute the nuts that come in contact with it so that some of the nuts are moved to fill the inclined channels 26 in the reciprocating board. When this has taken place the rectangular frame or distributing member 13 is pulled to the right so that the cross slats 24 of the frame 13 brush the nuts located in the channel into the holes 25 of the reciprocating board, thus ensuring the filling of the holes that are not filled by gravity and the excess nuts are brushed off thereby. This position is illustrated in Figure 5. As soon as this is done the frame is allowed to move back to its normal starting position in which the holes 25 are again covered by the cross slats 24.

For the purpose of moving the rectangular frame 13 to the left to fill the holes in the reciprocating member with the nuts a handle 37 is provided. This handle is mounted to swing on a cross bar 38 mounted between the sides 9 and 10 and has a link 39 pivoted thereto with which it is connected with the right hand end of the frame 13 as illustrated in Figures 1 to 4. When moving the frame 13 to the right as above described it is moved against the resistance of the expansion springs 16 and 17 so that when the frame is released these springs move the frame automatically back to their normal position against the stops 18 and 19.

After the holes 25 in the reciprocating board 14 have been filled in the manner above described the conveyor board is moved to the left to bring the upper ends of the inclined chutes in line with the openings in the reciprocating board. This is done by turning the crank 35 so that the arms 33 mounted on the shaft 34 press against the right hand end of the dipping frame 30 and force this frame against the depending lugs 36 at the left of the conveyor board 15. In this way the conveyor board 15 is simultaneously moved with the dipping frame 30 to the left against the resistance of the expansion springs 20 and 21 until the upper ends of the chutes 27 are directly below and in line with the holes in the reciprocating board. When this happens the nuts previously located in these holes fall into the chutes and are conveyed through them into the spoons or baskets carried in the dipping frame. This position of the parts of the hopper is illustrated in Figure 6.

After the nuts have been received by the spoons or baskets the dipping frame and conveyor plate is again released so that the expansion springs 20 and 21 can automatically move the conveyor plate and the dipping frame to their original position illustrated in Figure 4 so that another series of nuts can be sorted and placed into the holes in the reciprocating frame.

When the baskets or spoons of the dipping frame have been filled in the manner above described, the frame is moved from under the hopper to the right thereof until it is located directly above the dipping pan 40. There the nuts are dipped into the pan to be coated with the liquid chocolate contained therein. For this purpose the dipping frame is mounted to slide between the guide rails 28 and 29 so that it can be moved by hand into the desired position in the machine.

As illustrated in detail in Figure 3 each of the spoons or baskets 32 is made up of a small wire frame comprising an elongated horizontal loop 41 which is slightly enlarged and closed on the outer end while the free ends of the loop are clamped to the top of the shafts 31 by means of suitable clamping bolts 42. To the under side of the closed wire loop 41 are fastened a pair of cross members 44 and 45 as well as a short longitudinal member 46. Each of these members has its outer ends bent upwardly to form a series of five upwardly projecting prongs around the end of the wire loop 41 between which the nut is held in place in the outer end of the loop 41. For the purpose of making the nuts cling to the spoon or basket, they are first immersed in the liquid chocolate and thus coated previously to the placing of the nuts into them. In this way the nuts are made to adhere to the inside of the spoons or baskets in addition to being held therein by means of the prongs formed around it.

When, therefore, the dipping frame is placed over the dipping pan the spoons can be given a complete revolution during which they are immersed in the liquid chocolate and again withdrawn from it as illustrated in Figure 7. The coating of chocolate which makes the nuts adhere to the inside of the spoons will not allow the nuts to fall out therefrom during the revolution of the spoons.

After the nuts have been coated in this manner the dipping frame is moved to the right hand end of the machine. During this movement the dipping frame is passed over a series of wiping bars 45$^A$ which are adapted to make contact with the under side of the basket or spoons as they pass over it and wipe off any surplus chocolate that may be hanging on the under side of the baskets or spoons. This surplus chocolate is allowed to drop into an auxiliary pan where this surplus chocolate is collected.

At the right hand end of the machine the dipping frame is located above a table 47. This table is independently supported from the frame of the machine so that the vibration of the machine due to the reciprocation of the board 14 does not affect this table. When over this table the spoons 32 are again rotated, but this time only about a half of a revolution which brings the spoons into the position illustrated in Figure 8 so that the coated nut can drop out therefrom and onto the table 47. When the table has been filled with the coated nuts it is moved to the right on suitable guides and through an opening in the wall 48 which separates the chocolate coating machine from a cooling room in which the coating of the nuts is allowed to cool off and set.

The rotation of the spoons for the purpose of coating the nuts and depositing the coated nuts on the table is effected by a series of bevel gears 49 and 50 which are keyed to the outer end of the horizontal shafts 31 and to the shaft 51 respectively as illustrated in Figure 1. A crank 52 is formed on the outer end of the shaft with which the shaft 51 can be rotated for the purpose of rotating the spoons as above pointed out.

For the purpose of supplying the dipping pan with liquid chocolate an auxiliary supply pan 53 is mounted on one side of the machine and a spout 53$^A$ projects over the machine so that the chocolate from the pan 53 can be emptied into the pan 40.

The pan 40 has a burner 54 mounted below it so that the temperature of the liquid chocolate can be kept at a constant temperature in order to keep the chocolate in the proper liquid state suitable for coating.

Underneath the hopper is provided a heating plate 55 which is kept at a constant heat for the purpose of keeping the spoons or baskets at a uniform heat. This is necessary in order to prevent the chocolate with which they are coated from setting thereon but keep this coating of chocolate in a liquid state in which the nuts deposited therein will readily adhere thereto.

It will be understood that the vibration of the reciprocating board 14 is not merely local in its effect but is communicated to the whole machine with the result that the excess chocolate is shaken off the nuts after they have been dipped so that it drops back into the tank and the coated nuts are freed from the forks and are the more readily deposited on the receiving board.

I claim:

1. In a chocolate dipping machine, the combination of a hopper, said hopper comprising a distributing member, a locating member and a conveying member, means carried by said distributing member to allow the nuts to pass into holes provided in said locating member, and means provided by said conveying member to receive the nuts contained in the holes in said locating member and convey them away from said locating member, spoons located below said conveying member to receive the nuts conveyed from said locating mechanism, means for swinging said spoons and dipping them into a pan containing liquid chocolate at the end of its movement in one direction and means to receive the coated nut from said spoons at the end of its movement in the reverse direction.

2. In a chocolate dipping machine adapted to coat nuts the combination of a hopper, a locating mechanism provided in said hopper, a dipping frame, spoons mounted to rotate in said frame, means to convey the located nuts in said hopper into spoons in said dipping frame, a dipping pan, said dipping frame being adapted to be moved over said dipping pan, means adapted to rotate said spoons and dip them into said dipping pan during the rotation thereof, a receiving table, said dipping frame being adapted to be moved over said receiving table, the nuts in said spoons being adapted to be deposited on said receiving table by giving said spoons a half of a revolution.

3. In a chocolate dipping machine, the combination of a frame, an eccentric mounted to rotate on said frame, a distributing frame mounted on said frame, slats carried in the bottom of said frame, a reciprocating locating board mounted below said distributing frame, said locating board having holes provided therein, channels leading into the holes in said locating board, an eccentric rod connecting said locating board with said eccentric to reciprocate said locating board on the rotation of said eccentric, means for rotating said eccentric, a conveyor board mounted below said locating board, chutes mounted in said conveyor board, said distributing frame being adapted to be moved to allow the nuts to pass from the channels into the holes in said locating board, said conveying board being adapted to be moved to bring said chutes in line with the holes in said locating board to allow the nuts contained therein to pass therethrough, a dipping frame mounted below said conveyor board, spoons mounted in said dipping frame adapted to receive the nuts passing out of said chutes, means for rotating said spoons, a dipping pan into which said spoons dip the nuts on the rotation of said spoons, a wiper mounted below said spoons to wipe off the excess chocolate hanging on said spoons after the nuts have been coated by them, a heating member mounted below said hopper to keep said spoons at an even temperature while receiving the nuts from said conveyor board.

4. In a chocolate dipping machine, the combination of a hopper, means for locating nuts in predetermined points in said hopper, spoons mounted below said hopper and means for conveying the nuts from said predetermined position into said spoons, said spoons being adapted to be moved from under said hopper and over a dipping pan and means for rotating said spoons with the nuts contained therein to dip said nuts into the liquid chocolate contained in said dipping pan and coat the nuts with the chocolate.

5. A spoon or basket for chocolate dipping machines, comprising a wire loop, cross members provided on the under side of said loop at one end thereof, a longitudinal member connecting said cross member with the end of said wire loop, vertical prongs formed on the ends of said cross members and said vertical member to form a receptacle for the reception of nuts, or other eatables to be coated, a shaft and means for fastening said wire loop to said shaft, and means for rotating said shaft with said spoon.

In testimony whereof I affix my signature.

ARTHUR C. McCORD.